US012182164B2

(12) United States Patent
Brooks Powell et al.

(10) Patent No.: US 12,182,164 B2
(45) Date of Patent: Dec. 31, 2024

(54) CONTEXT-BASED SAVING OF DATA

(71) Applicant: International Business Machines Corporation, Armonk, NY (US)

(72) Inventors: Natalie Brooks Powell, Bolingbrook, IL (US); Jeremy R. Fox, Georgetown, TX (US); Michael Bender, Rye Brook, NY (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 633 days.

(21) Appl. No.: 17/390,598

(22) Filed: Jul. 30, 2021

(65) Prior Publication Data

US 2023/0033354 A1 Feb. 2, 2023

(51) Int. Cl.
*G06F 16/17* (2019.01)
*G06F 16/23* (2019.01)
*G06F 16/27* (2019.01)

(52) U.S. Cl.
CPC .......... *G06F 16/273* (2019.01); *G06F 16/173* (2019.01); *G06F 16/2379* (2019.01)

(58) Field of Classification Search
CPC ............................ G06F 16/173; G06F 16/2379
See application file for complete search history.

(56) References Cited

U.S. PATENT DOCUMENTS

| 7,849,476 | B2 | 12/2010 | Stevens et al. | |
| 10,599,526 | B2 | 3/2020 | Milvaney et al. | |
| 2003/0236933 | A1* | 12/2003 | Shigeta | G06F 11/14 |
| | | | | 710/72 |
| 2007/0150174 | A1 | 6/2007 | Seymour et al. | |
| 2013/0013875 | A1 | 1/2013 | Brown et al. | |
| 2013/0317384 | A1* | 11/2013 | Le | G16H 20/70 |
| | | | | 600/545 |
| 2015/0200832 | A1 | 7/2015 | Kurniady et al. | |
| 2020/0310842 | A1* | 10/2020 | Yen | G06F 9/453 |
| 2020/0357363 | A1* | 11/2020 | Reich | G06F 3/03545 |
| 2022/0366296 | A1* | 11/2022 | Oruganti | G06F 18/2113 |

FOREIGN PATENT DOCUMENTS

| CN | 104424162 A | 3/2015 |
| CN | 106910044 A | 6/2017 |
| KR | 20150054061 A | 5/2015 |
| WO | 2019224468 A1 | 11/2019 |

OTHER PUBLICATIONS

IBM, "Data protection with BUaaS", printed Jun. 9, 2021, 6 pages <https://www.ibm.com/services/business-continuity/resiliency-backup-service?cm_sp=Scheduler-_-CopyChng2-_-V>.
Mell et al., "The NIST Definition of Cloud Computing", Recommendations of the National Institute of Standards and Technology, Sep. 2011, 7 pages.

* cited by examiner

*Primary Examiner* — Apu M Mofiz
*Assistant Examiner* — Dara J Glasser
(74) *Attorney, Agent, or Firm* — James L. Olsen

(57) ABSTRACT

Aspects of the present disclosure relate to context based saving of content. A set of conditions for automatically saving content for a user currently engaged with savable content can be received. A current context of the user currently engaged with savable content can be determined. The current context of the user can be compared to the set of conditions to determine whether automatically saving the savable content should be completed. The savable content can be automatically saved in response to determining that automatically saving the savable content should be completed.

16 Claims, 6 Drawing Sheets

CONTEXT-BASED SAVING OF DATA

BACKGROUND

The present disclosure relates generally to the field of computing, and in particular, to saving data based on context.

Autosave is a function of computer programs (e.g., computer applications and video games) that enables automatic saving of current changes and/or progress within a program. This can be used to reduce data loss if a technical or user error occurs. Autosave can be completed in predetermined intervals (e.g., every 5 minutes) or based on "checkpoints."

SUMMARY

Aspects of the present disclosure relate to a method, system, and computer program product for context-based autosaving. A set of conditions for automatically saving content for a user currently engaged with savable content can be received. A current context of the user currently engaged with savable content can be determined. The current context of the user can be compared to the set of conditions to determine whether automatically saving the savable content should be completed. The savable content can be automatically saved in response to determining that automatically saving the savable content should be completed.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
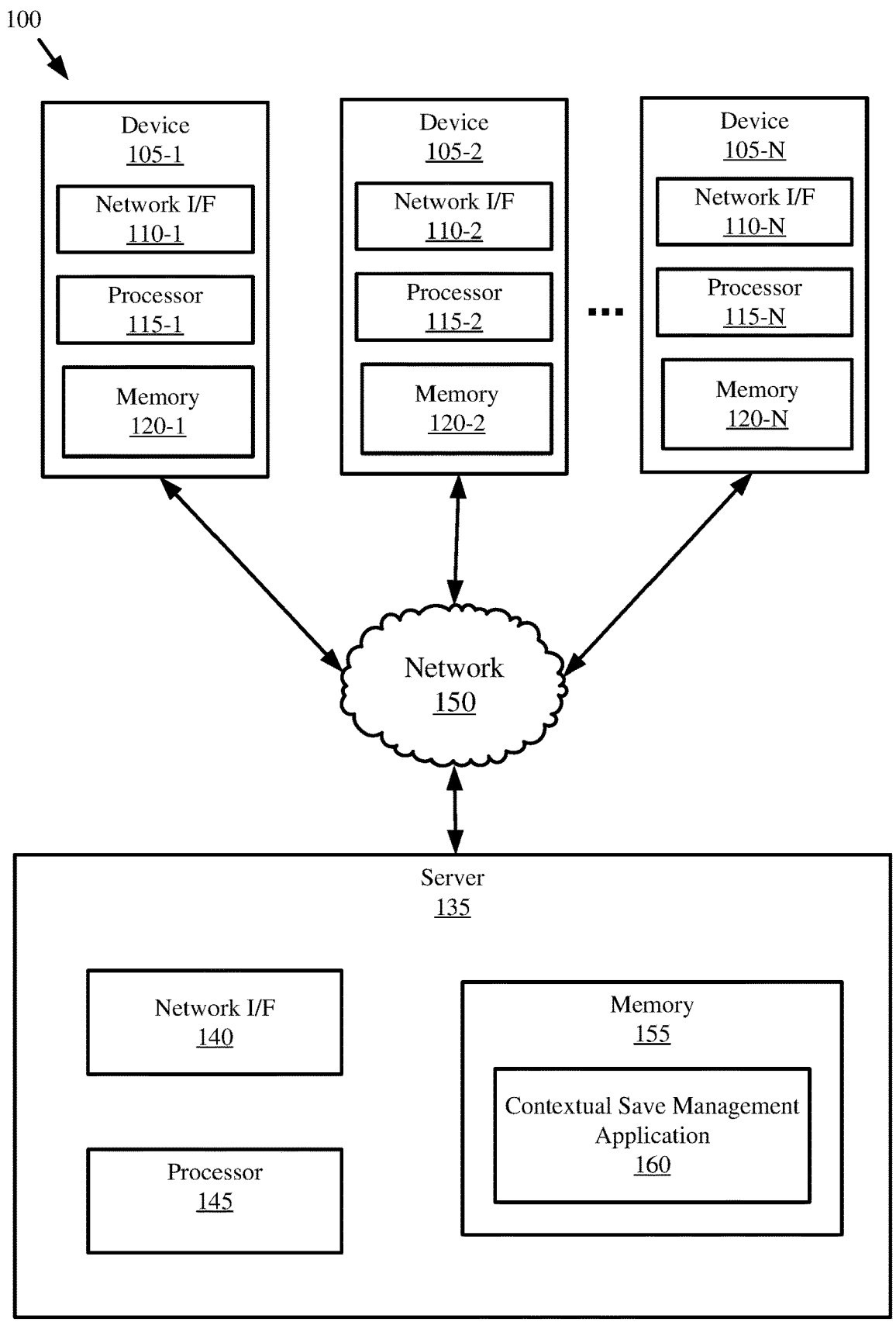
FIG. 1 is block diagram illustrating an example network environment, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and more particularly, to context-based saving of data. While the present disclosure is not necessarily limited to such applications, various aspects of the disclosure may be appreciated through a discussion of various examples using this context.

Autosave is a function of computer programs (e.g., computer applications and video games) that enables automatic saving of current changes and/or progress within a program. This can be used to reduce data loss if a technical or user error occurs. Autosave can be completed in predetermined intervals (e.g., every 5 minutes) or based on "checkpoints" (e.g., in video games). However, autosaving at predetermined intervals or based on checkpoints may be insufficient. For example, a user may reach a particular milestone while working within a computer program (e.g., a work product or video game) that may not be captured by a time-based or checkpoint-based autosave. In this instance, if the user experiences a technical issue causing data loss, they may lose the progress within the computer program that led to the milestone. As such, there is a need to improve autosave to prevent such data loss.

Aspects of the present disclosure relate to context-based saving of content. A set of conditions for automatically saving content for a user currently engaged with savable content can be received. A current context of the user currently engaged with savable content can be determined. The current context of the user can be compared to the set of conditions to determine whether automatically saving the savable content should be completed. The savable content can be automatically saved in response to determining that automatically saving the savable content should be completed.

There are advantages to context-based saving of data as compared to the limited autosave functionalities noted in conventional methods. For example, saving of content that a user is currently engaged with can be better timed. That is, contextual indicators may be more reliable for determining a save point of the savable content. For example, context such as a detected positive sentiment, keywords uttered by the user, biometric readings, etc., can indicate whether the user has reached particular milestones on the savable content. Thus, the content can be saved during meaningful time periods, rather than arbitrarily based on time intervals (e.g., every 5 minutes) or "checkpoints" (e.g., rules dictating the progression point of savable content at which a save should occur).

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

Consistent with various embodiments, the server 135 and the devices 105 are computer systems. The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110), and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, biometric scanner, video camera, or other input device) and/or any commercially available or custom software (e.g., browser software, communications software, server software, natural language processing software, search engine and/or web crawling software, image processing software, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other, and communicate via any appropriate local communication medium. For example, the devices 105 and the server 135 can communicate using a local area network (LAN), one or more hardwired connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable), while the second device 105-2 can communicate with the server 135 using the network 150 (e.g., over the Internet).

In some embodiments, the network 150 is implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150.

The server 135 includes a contextual save management application 160. The contextual save management application 160 can be configured to save the state of savable software content (e.g., a file, game file, source code file, etc.) based on contextual conditions associated with a user (e.g., sentiment, posture, facial expressions, voice input, biometrics, etc.) and/or an environment surrounding the user (e.g., audio and/or video data surrounding the user). In embodiments, the contextual save management application 160 can first be configured to determine (e.g., obtain or ascertain) conditions for automatic saving (e.g., "autosaving") of the state of computer software (e.g., within persistent memory).

Upon determining conditions for autosaving, the contextual save management application 160 can be configured to monitor (e.g., using one or more sensors, such as audio/video (A/V) devices and/or biometric monitoring devices) context surrounding a user engaged with (e.g., actively working on) savable content. The contextual save management application 160 can then determine whether a condition for autosaving the savable content is met.

If a condition for autosaving the savable content is met, then the content can be autosaved (e.g., written to a storage medium). In embodiments, the content can also be tagged (e.g., metadata can be added to the save file) in conjunction with saving. In embodiments, the tag can be associated with the contextual condition which caused the autosaving. If a condition for autosaving the savable content is not met, then the contextual save management application 160 can be configured to further monitor context to determine whether to save the savable content while the user is engaged with the savable content.

Though this disclosure pertains to the collection of personal data (e.g., sensor data such as video, audio, and biometric data), it is noted that in embodiments, users opt-in to the system (e.g., the contextual save management application 160). In doing so, they are informed of what data is collected and how it will be used, that any collected personal data may be encrypted while being used, that users can opt-out at any time, and that if they opt-out, any personal data of the user is deleted.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary. For example, though the contextual save management application 160 is shown as located on the server 135, in some embodiments, the contextual save management application 160 can be stored on devices 105. As an example, the functionalities of the contextual save management application 160 can be associated with (e.g., integrated within) a software application (e.g., a video game or word processing application) running on device 105-1.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
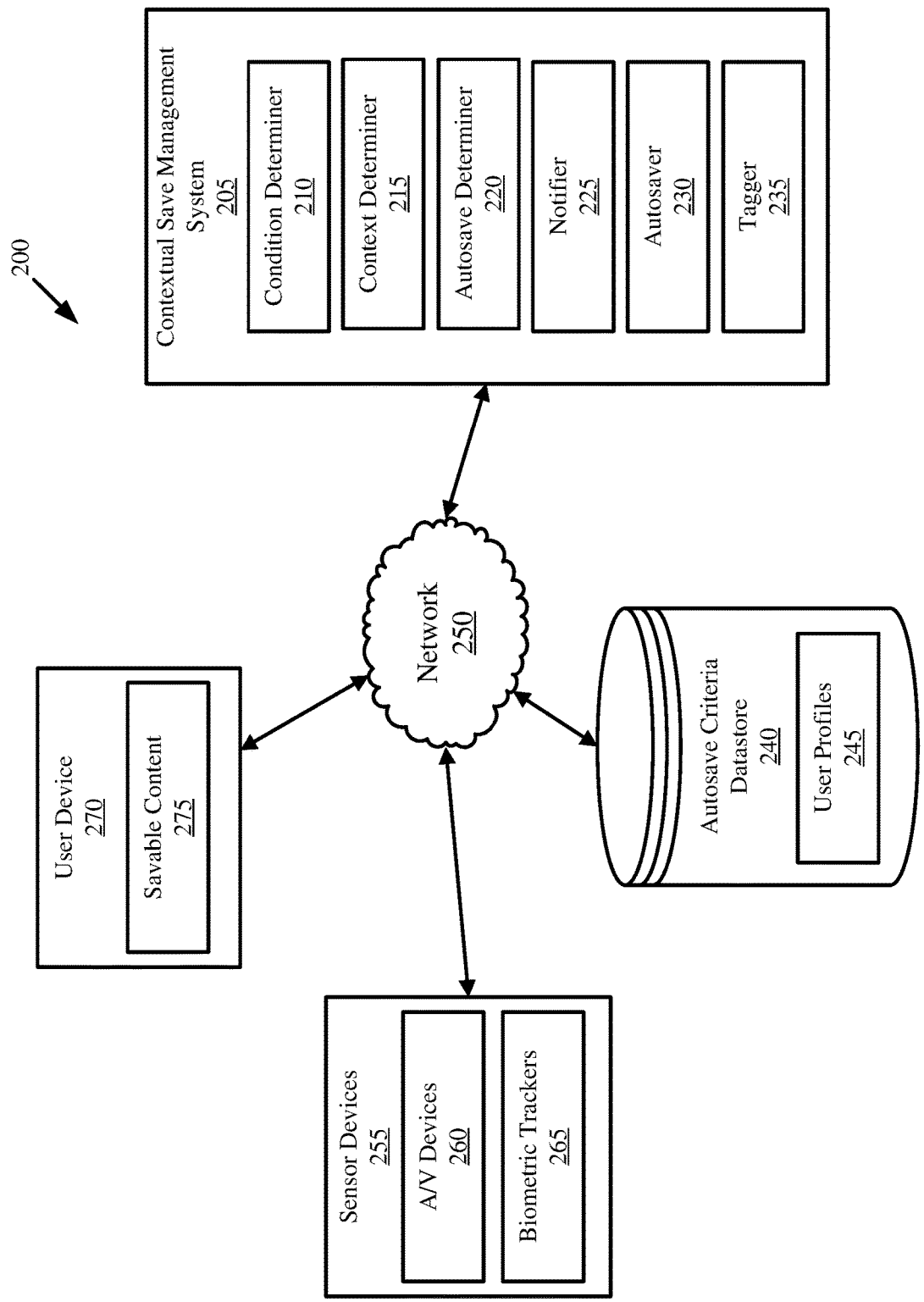
FIG. 2 is a block diagram illustrating an example network environment including a contextual save management system, in accordance with embodiments of the present disclosure.

Referring now to FIG. 2, shown is a block diagram illustrating an example network environment 200 in which illustrative embodiments of the present disclosure can be implemented. The network environment 200 includes a contextual save management system 205, a user device 270, an autosave criteria datastore 240, and sensor devices 255, each of which can be communicatively coupled for inter-component interaction via a network 250.

The contextual save management system 205 can be configured to automatically save content based on contextual data associated with a user engaged with the savable content. The contextual save management system 205 includes a condition determiner 210, a context determiner 215, an autosave determiner 220, a notifier 225, an autosaver 230, and a tagger 235. The condition determiner 210, context determiner 215, autosave determiner 220, notifier 225, autosaver 230, and tagger 235 can be processor-executable instructions that can be executed by a dedicated or shared processor using received inputs.

The condition determiner 210 can be configured to receive, obtain, and/or ascertain conditions (e.g., rules) for determining whether and when to autosave content. The conditions can be based on contextual data associated with a user. For example, conditions can specify that, in response to observing particular contextual indicators (e.g., by context determiner 215), that an autosave should occur. Thus, the condition determiner 210 receives, obtains, and/or ascertains rules for determining whether to autosave content.

In embodiments, conditions can be retrieved from autosave criteria datastore 240, which may include one or more user profiles 245 having user-tailored conditions. Thus, each user can have a unique set of conditions for determining whether and/or when their content should be saved. For example, a first user may have a first set of conditions that trigger autosaves, while a second user may have a second set of conditions that trigger autosaves. In embodiments, the autosave criteria datastore 240 can be local to the user device 270 and/or contextual save management system 205.

In embodiments, conditions for autosaving can be specified, edited, and/or modified by users. For example, users can set the contextual conditions in which they prefer autosaves to occur. For example, a first user can indicate that the observance of positive sentiment (e.g., based on tone, facial expression, etc.) should be set as a condition for autosaving content, while a second user can indicate that the observance of negative sentiment should be set as a condition for autosaving content. Any suitable contextual data, including, but not limited to, sentiment, posture, gestures, biometrics, audio data (e.g., tone, recognized words, etc.), video data, input device characteristics (e.g., keystrokes on a keyboard over time), and/or progress made within savable content 275 (e.g., a passed test case for source code) can be used as conditions for determining whether and when to save content. In embodiments, users can set thresholds (to be discussed below) for automatically saving savable content 275. In embodiments, users can manually activate sensor devices 255 for monitoring their context to determine when savable content 275 should be saved.

In some embodiments, conditions can be altered (e.g., refined) based on feedback received from users. For example, users can provide feedback regarding their satisfaction (e.g., satisfied, neutral, dissatisfied) with particular autosaves. In embodiments, the feedback can be used as input data for a machine learning algorithm to alter conditions for determining autosaves. For example, if a user is unhappy with a first autosave that was captured in response to a first set (e.g., one or more) of observed contextual indicators, then the user can specify they were dissatisfied with the first autosave. A machine learning algorithm can then be configured to adjust conditions (e.g., rules) for determining autosaves such that future autosaves are not based on the same contextual indicators.

Machine learning algorithms that can be used to adjust rules for determining whether and when to autosave can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Any of the data discussed with respect to the contextual save management system 205 and/or autosave criteria datastore 240 can be analyzed or utilized as training data using any of the aforementioned machine learning algorithms.

More specifically, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The context determiner 215 can be configured to determine a current context of a user engaging with savable content 275. The context determiner 215 can be configured to receive data from sensor devices 255 and user device 270 over network 250. The data received from sensor devices 255 and the user device 270 may include various contextual indicators associated with the user, which may be compared to conditions (e.g., rules) specified by the condition determiner 210 such that the autosave determiner 220 can determine whether to autosave the savable content 275 (e.g., based on a comparison between the current context and the conditions for autosaving).

Sensor data collected by the context determiner 215 can include but is not limited to, biometric data (e.g., heartbeats per minute, breaths per minute, glucose readings, etc.), visual data (e.g., image data), audio data (e.g., audio recordings), time data (e.g., day of the week, time of day, etc.), location data (e.g., GPS data), action input data (e.g., keystrokes from a keyboard or actions input by a controller), network activity data (e.g., browsing data), and others. Sensor devices 255 can include any suitable sensors for collecting sensor data, including, but not limited to, A/V devices 260 (e.g., cameras, microphones), biometric trackers 265 (e.g., heart rate monitors, breath rate monitors, glucose level monitors, etc.), GPS sensors, accelerometers, gyroscopes, keyboards, controllers, and network interface controllers.

In embodiments, the context determiner 215 can be configured to process the collected sensor data. This can be completed such that the sensor data can be converted or otherwise structured into a form suitable for determining whether to autosave. For example, video data of a user can be analyzed (e.g., using one or more image processing algorithms) to determine the facial expressions, posture, and gestures of the user. This can be used for determining the user's sentiment (e.g., a mood of the user). As another example, audio data of a user can be analyzed to determine the tone and recognized words of a user. This can similarly be used for determining the user's sentiment.

The autosave determiner 220 can be configured to receive the current context from the context determiner 215 as well as the rules for autosaving from the condition determiner 210. Thereafter, the autosave determiner 220 can compare the current context to the rules to determine whether to autosave savable content 275 the user is engaged with.

A variety of conditions (e.g., rules) may be implemented to determine whether and when to autosave content. In embodiments, rules can indicate that a sensor value being greater than, less than, or equal to (e.g., satisfying) a particular sensor value threshold can cause an autosave. For example, if a biometric reading (e.g., 90 beats per minute (BPM)) is equal to or greater than a biometric reading threshold (e.g., 80 BPM), a determination can be made to autosave savable content 275. As another example, if a decibel reading obtained from a microphone (e.g., 40 db) exceeds a threshold (e.g., 30 db), then a determination can be made to autosave content. Autosaving of content can be completed using any suitable sensor data values/thresholds.

Thus, aspects of the present disclosure recognize that a first set of sensor data can be obtained and compared to a first threshold, and based on the comparison (e.g., greater than, less than, equal to), a first autosave can be completed. Similarly, a second set of sensor data can be obtained and compared to a second threshold, and based on the comparison (e.g., greater than, less than, equal to), a second autosave can be completed.

In embodiments, a rate of change of sensor data can be compared to a rate of change threshold to determine whether to issue an autosave. For example, if a rate of change of a particular set of sensor data (e.g., 20 BPM/s) exceeds a rate of change threshold (e.g., 10 BPM/s), then a determination can be made to autosave. This can be completed using the rate of change of any suitable sensor data metric.

Thus, aspects of the present disclosure recognize that a first set of sensor data can be obtained, a rate of change of the first set of sensor data over a first time period can be calculated, and the rate of change of the first set of sensor data can be compared to a first threshold. Based on the comparison (e.g., greater than, less than, equal to), a first autosave can be issued. Similarly, a second set of sensor data can be obtained, a second rate of change of the second set of sensor data over a second time period can be calculated, and the second rate of change of the second set of sensor data can be compared to a second threshold. Based on the second comparison (e.g., greater than, less than, equal to), a second autosave can be issued.

In some embodiments, a classification (e.g., output by a machine learning model such as a neural network) of sensor data can lead to an autosave. For example, assume while a user is engaging with savable content 275, an image (or video) is captured of a user's face. If an emotion detection model (e.g., sentiment analysis) run on the image of the user's face indicated that the user was any of the following classifications: "frustrated," "sad," "annoyed," or "confused," then a determination can be made to issue an autosave. This can be completed using any suitable classification. For example, autosaving can also be completed based on positive sentiment classifications, such as "excitement," "happiness," and "relief," as these positive sentiments may indicate a progression of work in progress.

Stored classifications used to autosave content can include speech or facial-based recognition algorithms. These include tone, diction, and emotion classification algorithms. These algorithms may be integrated within the context determiner 215 or remotely accessed via network 250. An example algorithm capable of analyzing tone and classifying sentiment is IBM Watson™ Tone Analyzer.

Aspects of the present disclosure recognize that pre-processing of data may be required in order to properly classify the data. For example, if audio data is captured, speech-to-text conversion may be required for proper classification of the audio data. Similarly, image pre-processing techniques (e.g., brightness transformations, geometric transformations, pixel alterations, etc.) may be required for the proper classification of image data.

Thus, aspects of the present disclosure recognize that the determination of a first classification (e.g., a first tone, emotion, or sentiment) can lead to a first autosave, while the determination of a second classification (e.g., a second tone, emotion, or sentiment) can lead to a second autosave as set forth in rules defined by condition determiner 210.

In some embodiments, keywords identified within audio data associated with a user engaged with savable content 275 can lead to an autosave. For example, rules of condition determiner 210 can include a table of keywords that, when recognized, lead to an autosave. The identification of one or more keywords within rules of condition determiner 210 can lead to a corresponding autosave. For example, the identification of keywords "complete" or "done" within an audio recording can lead to an automatic save.

Thus, aspects of the present disclosure recognize that the identification of a first keyword or set of keywords within an audio recording can lead to a first autosave, while the detection of a second keyword or set of keywords within an audio recording can lead to a second autosave as set forth in rules of the condition determiner 210.

In some embodiments, keystrokes made by a user can be used to determine whether to autosave. For example, the words per minute (WPM) or other keystroke metrics (e.g., key pressure), can be captured and analyzed to determine whether an autosave should be completed. As an example, in response to words per minute (WPM) of a user falling below a particular threshold (e.g., 50 WPM), an autosave can be automatically completed. This can be completed as if the WPM of a user falls. It likely means they just finished typing a significant portion of the savable content 275. However, savable content 275 can be saved based on any input metrics measured overtime. For example, actions per minute (APM) measured by a controller or other device can be used to determine whether to save content.

In embodiments, time/location data can be used to autosave content. For example, in response to the detection of a particular time, or the determination that the user has traveled to a particular location, an autosave may be completed. For example, if GPS data associated with user device 270 indicates that the user has left their workspace (e.g., the workspace including user device 270) where they were engaged with savable content 275, then the rules of the condition determiner 210 may specify that an autosave should be completed. This can be completed as if the user has left the work unattended. Automatically saving the content may be helpful (e.g., to save content that may be modified by another individual without their consent).

Similarly, if a particular time is detected, rules set in condition determiner 210 can specify whether and when to autosave content. For example, in response to detecting a particular time (e.g., 2:00 AM), a first autosave may be completed. This can be completed as the user may become tired during particular times, and if the user is actively engaged with savable content 275 during these times, it may be beneficial to save the state of the savable content 275 in response to observing the particular times.

Thus, aspects of the present disclosure recognize that the identification of a first time (e.g., time of day, day of the week, etc.) and/or first location (e.g., GPS coordinate, geofence, etc.) can lead to a first autosave, while the identification of a second time and/or second location can lead to a second autosave as set forth in rules of the condition determiner 210.

In embodiments, multiple factors can be simultaneously considered when determining whether to issue an autosave. That is, factors such as sensor value readings, classifications, keywords, time/location, and others can be simultaneously considered when determining whether to autosave content. In some embodiments, an autosave score can be calculated based on a plurality of weighted factors and compared to a threshold to determine whether an autosave should be issued. The autosave score can be calculated according to a formula Autosave Score=$factor_1 \times weight_1 + factor_2 \times weight_2 \ldots + factor_n \times weight_n$. The autosave score can then be compared to one or more threshold to determine whether to issue an autosave on the savable content 275.

Values for factors (e.g., $factor_1$-$factor_n$) can be assigned/determined in any suitable manner. For example, if a keyword match is taken into consideration as a factor, a value of "1" can be assigned if a particular keyword match is found, and a value of "0" can be assigned if the keyword match is not found. Similarly, if a classification match is taken into consideration as a factor, a value of "1" can be assigned if a particular classification match is found, and a value of "0" can be assigned if a classification match is not found. As another example, if heart rate sensor readings are taken into consideration as a factor, a value of "1" can be assigned at a first BPM range (e.g., 90-100), a value of "0.75" can be assigned at a second BPM range (e.g., 80-90), a value of "0.50" can be assigned at a third BPM range (e.g., 70-80), etc.

Weights (e.g., $weight_1$-$weight_n$) assigned to factors can similarly be assigned/determined in any suitable manner. In embodiments, factors most likely to be important for autosaving are assigned a high weight, whereas factors least likely to be important for autosaving are assigned a low weight. For example, following the example above, the keyword match factor could have a weight of 0.30, the classification match factor could have a weight of 0.50, and the heart rate sensor BPM readings could have a weight of 0.20. However, any suitable weights can be assigned to factors.

Following the example above, if a keyword match is not found, a classification match is found, and a BPM is recorded at 80 BPM, the autosave score can be calculated as (0×0.50)+(1×0.30)+(0.5×0.20)=0.40. In this example, if a threshold was defined as 0.50 such that any autosave score exceeding 0.50 leads to an autosave, then an autosave would not be completed. Though reference is made to example calculations, any suitable values can be substituted for those shown without departing from the spirit and scope of the present disclosure.

In embodiments, machine learning techniques can be used to identify rules of the condition determiner 210 that are effective at matching a user's intentions. For example, a machine learning algorithm can ingest many autosaves occurring for a given user and fine-tune the rules of the condition determiner 210 to better match the user's intentions (e.g., based on their perceived sentiment).

In embodiments, user feedback can be requested after an autosave occurs to gauge whether the user was satisfied or dissatisfied with the save. This can be used to adjust rules for future autosaves (e.g., by providing reward/punishment to a supervised reinforcement machine learning algorithm). For example, if a user is satisfied with a given autosave, then positive feedback can be issued. If a user is dissatisfied with a given autosave, then negative feedback can be issued.

The notifier 225 can be configured to transmit one or more notifications indicating the occurrence of an autosave. Notifications include, but are not limited to, texts, emails, push notifications, and/or notifications within the software applications that the user is working. In embodiments, notifications can be transmitted over network 250 to one or more devices.

The autosaver 230 can be configured to automatically save content (e.g., write data of a save file to a storage medium) based on a determination received from the autosave determiner 220. Thus, if the autosave determiner 220 ascertains that conditions for autosaving savable content are met, then the autosave determiner 220 may issue a signal to the autosaver 230 such that the autosave can be completed.

The tagger 235 can be configured to tag the savable content 275. Tags can include metadata that can be appended to a save file (e.g., savable content 275). For example, the savable content 275 can be named with a particular name, or metadata can be added as attributes to the save file. In embodiments, the tag can be associated with the context which caused the automatic save. For example, if an autosave was completed based on the recognition of a keyword "Complete," then the save file name can include the keyword "Complete." Tagging the savable content can be completed based on any observed context (e.g., biometric readings, observed sentiments, time, location, keystrokes, etc.).

In embodiments, upon saving the savable content by the autosaver 230, the saved file can be maintained without overwriting a previous version. For example, each autosaved version can be stored in a folder (e.g., corresponding to the work product). This can be completed such that the user can selectively choose versions of the file to work on based on the context indicated by tags. In some embodiments, the user can be prompted to select one or more versions to keep and/or one or more version to erase/overwrite. This can allow the user to free up storage space in cases where many versions of the same document at different time points are stored.

Figure 3:
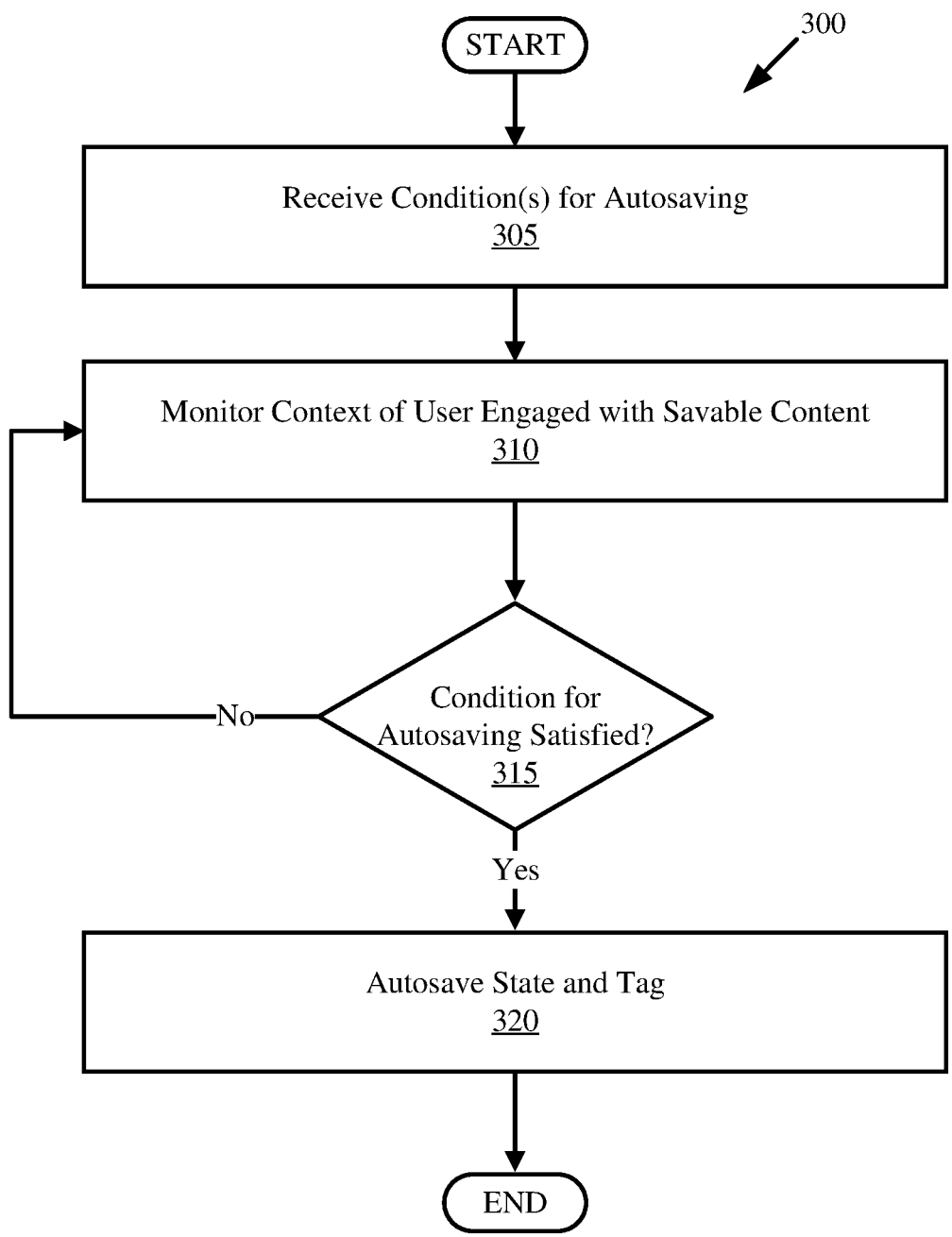
FIG. 3 is a flow-diagram illustrating an example method 300 for context-based autosaving, in accordance with embodiments of the present disclosure.

Referring now to FIG. 3, shown is a flow diagram of an example method 300 for context-based autosaving, in accordance with embodiments of the present disclosure. One or more operations of method 300 can be completed by one or more processing circuits (e.g., of devices 105, server 135, user device 270, sensor devices 255, and/or contextual save management system 205).

Method 300 initiates at operation 305, where condition(s) for autosaving are received. Conditions for autosaving can be the same as, or substantially similar to, conditions (e.g., rules) described with respect to the condition determiner 210 of FIG. 2. Conditions for autosaving content can be updated over time (e.g., by a user or a machine learning algorithm). Conditions can specify particular contextual indicators (e.g., sensor values, classifications, times, dates, and the like) for determining whether autosaves should be completed.

Context (e.g., a current context) of a user currently engaged with savable content is then determined. This is illustrated at operation 310. Determining the current context can be completed based on received sensor data (e.g., from A/V devices, biometric trackers, input devices, and the like) and/or any processing of the sensor data (e.g., classification such as sentiment analysis, tone analysis, etc.) required to compare the current context to the received conditions at operation 305. Determining the current context can be completed in the same, or a substantially similar manner, as described with respect to the context determiner 215 of FIG. 2.

A determination is then made whether a condition for autosaving content is satisfied. This is illustrated at operation 315. Determining whether a condition for autosaving content is satisfied can be completed in the same, or a substantially similar manner, as described with respect to the autosave determiner 220 of FIG. 2. For example, a plurality of individual weighted factors can be collectively considered to determine an autosave score. The autosave score can then be compared to a threshold to determine whether an autosave should be completed.

If a determination is made that a condition for autosaving is not satisfied ("No" at operation 315), then method 300 returns to operation 310, where the context of the user engaged with the savable content is monitored.

If a determination is made that a condition for autosaving is satisfied ("Yes" at operation 315), then method 300 proceeds to operation 320, where the savable content is saved (e.g., written to a storage medium) and tagged. Autosaving completed at operation 320 can be the same as, or substantially similar to, autosaving as described with respect to the autosaver 230 of FIG. 2. Tagging the savable content can be completed in the same, or a substantially similar manner, as described with respect to the tagger 235 of FIG. 2. In embodiments, notification of the automatic save can also be completed (e.g., prior to or after the automatic save is completed).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
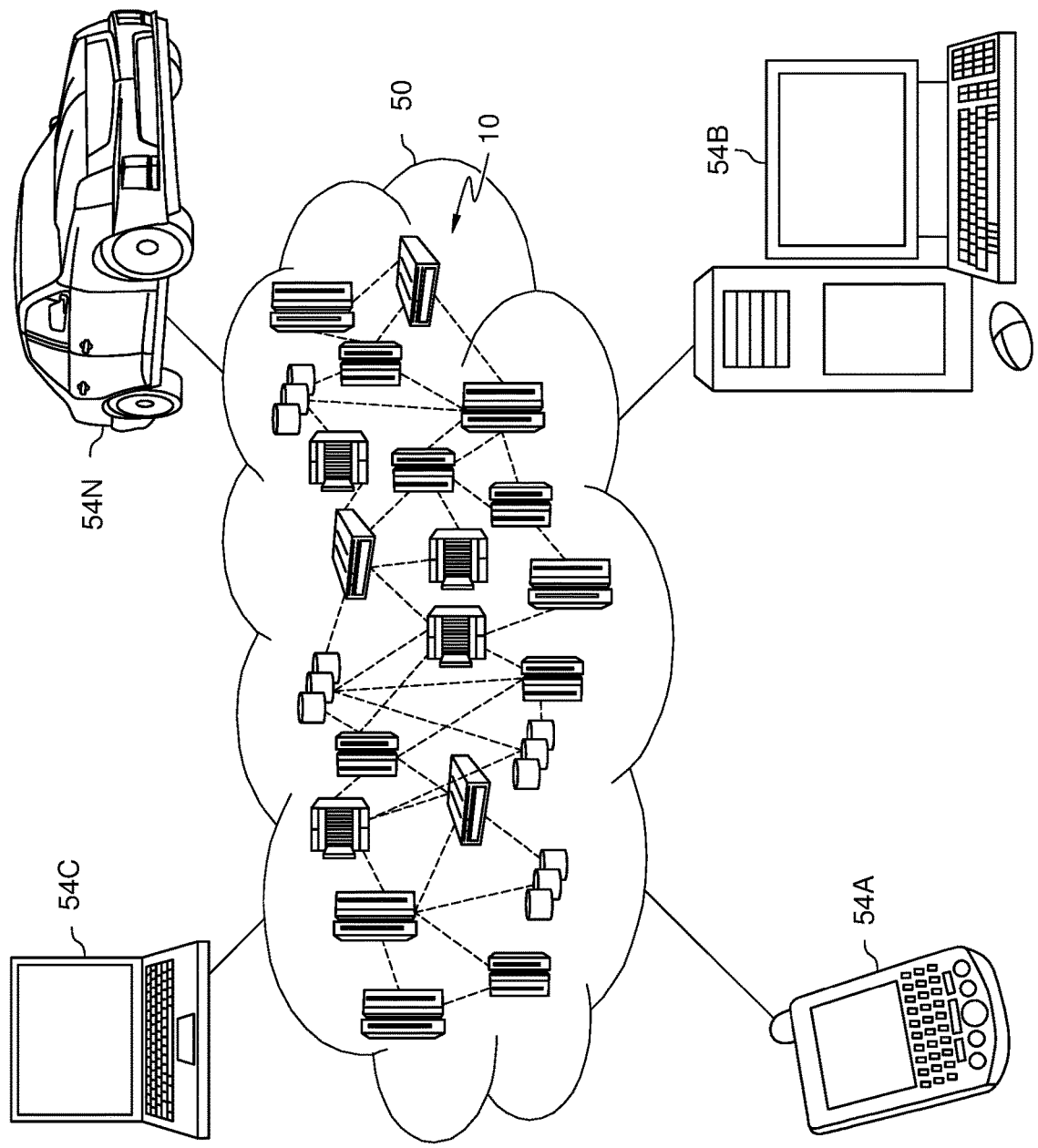
FIG. 4 is a diagram illustrating a cloud computing environment, in accordance with embodiments of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
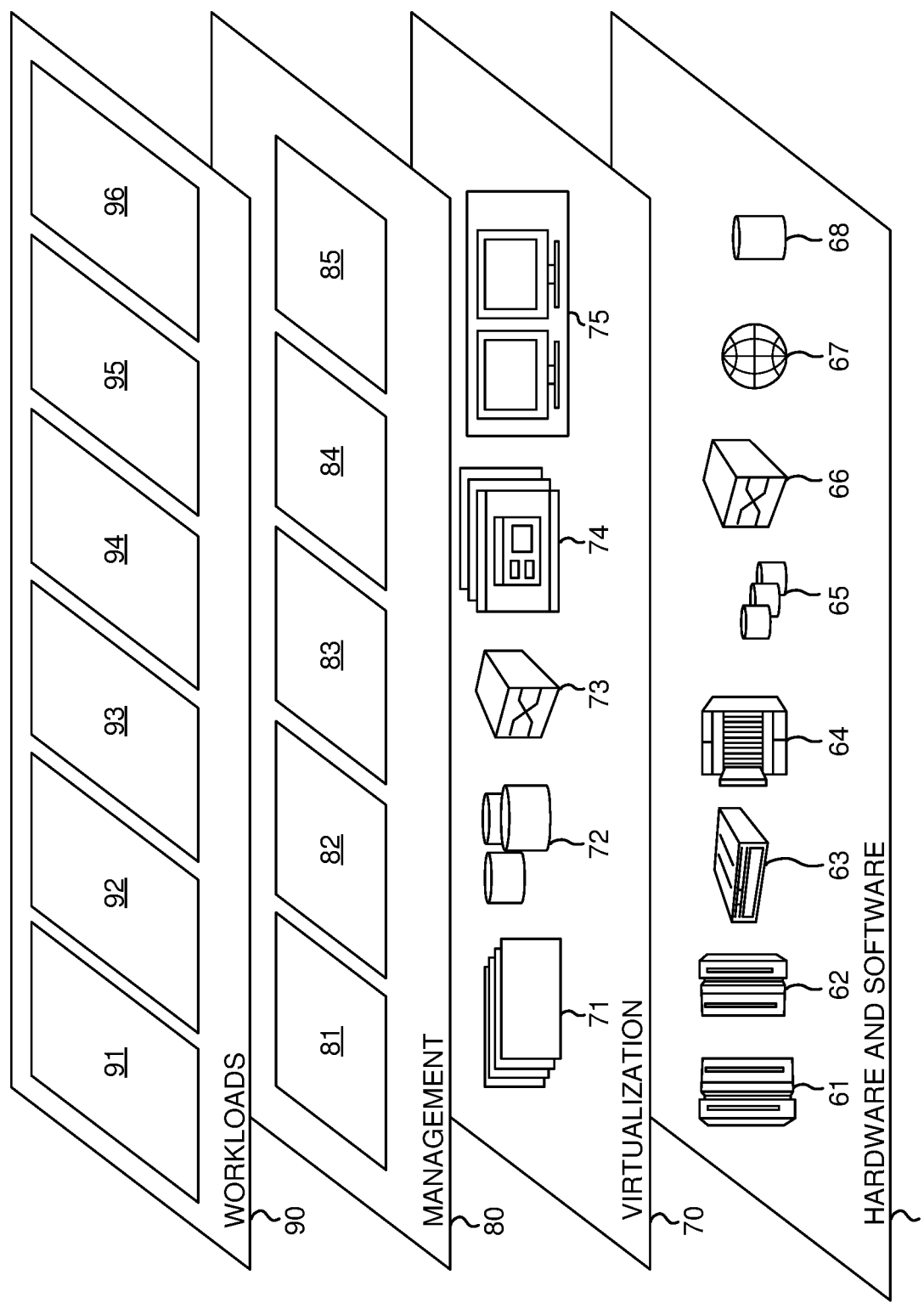
FIG. 5 is a block diagram illustrating abstraction model layers, in accordance with embodiments of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and save management 96.

Figure 6:
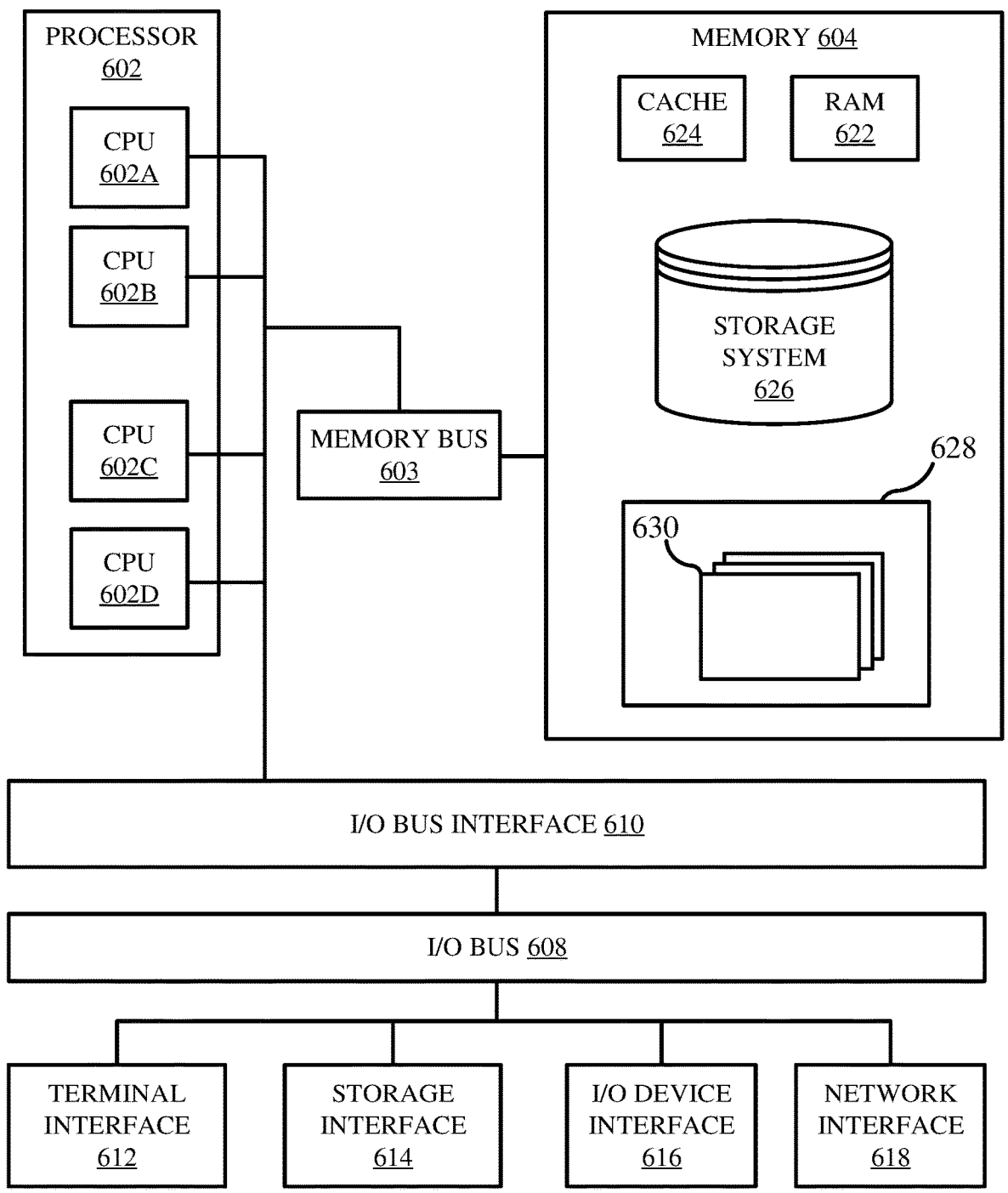
FIG. 6 is a high-level block diagram illustrating an example computer system that can be used in implementing one or more of the methods, tools, and modules, and any related functions described herein, in accordance with embodiments of the present disclosure.

Referring now to FIG. 6, shown is a high-level block diagram of an example computer system 601 (e.g., devices 105 and server 135) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

The aforementioned operations can be completed in any order and are not limited to those described. Additionally, some, all, or none of the aforementioned operations can be completed, while still remaining within the spirit and scope of the present disclosure.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to those skilled in the art. Therefore, it is intended that the following claims be interpreted as covering all such alterations and modifications as fall within the true spirit and scope of the disclosure.

What is claimed is:

1. A method comprising:
receiving a set of conditions for automatically saving content for a user currently engaged with savable content, wherein a first condition of the set of conditions specifies that automatically saving content is completed in response to a biometric sensor value of the user satisfying a biometric sensor value threshold;
determining a current context of the user currently engaged with the savable content by obtaining a current biometric sensor value of the user;
comparing the current context of the user to the set of conditions to determine whether automatically saving the savable content should be completed, wherein the comparing includes determining whether the current biometric sensor value of the user satisfies the biometric sensor value threshold; and
automatically saving, in response to determining that automatically saving the savable content should be completed, the savable content, wherein determining that automatically saving the savable content should be completed includes determining that the current biometric sensor value of the user satisfies the biometric sensor value threshold, wherein the savable content is tagged with a tag comprising metadata that indicates that the automatic saving occurred due to the current biometric sensor value satisfying the biometric sensor value threshold.

2. The method of claim 1, wherein a second condition of the set of conditions specifies that a determined classification determined via sentiment analysis matching to a stored classification leads to an automatic save.

3. The method of claim 1, wherein a second condition of the set of conditions specifies that an autosave score calculated based on a plurality of weighted contextual factors satisfying an autosave score threshold leads to an automatic save.

4. The method of claim 1, wherein the tag is a file name of the savable content.

5. A system comprising:
one or more processors; and
one or more computer-readable storage media collectively storing program instructions which, when executed by the one or more processors, are configured to cause the one or more processors to perform a method comprising:
receiving a set of conditions for automatically saving content for a user currently engaged with savable content, wherein a first condition of the set of conditions specifies that automatically saving content is completed in response to actions per minute (APM) performed by at least one input device of the user satisfying an APM threshold;
determining a current context of the user currently engaged with the savable content by obtaining a current APM performed by the at least one input device of the user;
comparing the current context of the user to the set of conditions to determine whether automatically saving the savable content should be completed, wherein the comparing includes determining whether the current APM performed by the at least one input device of the user satisfies the APM threshold; and
automatically saving, in response to determining that automatically saving the savable content should be completed, the savable content, wherein determining that automatically saving the savable content should be completed includes determining that the current APM performed by the at least one input device of the user satisfies the APM threshold, wherein the savable content is tagged with a tag comprising metadata that indicates that the automatic saving occurred due to the current APM performed by the at least one input device of the user satisfying the APM threshold.

6. The system of claim 5, wherein a second condition of the set of conditions specifies that a sensor value satisfying a sensor value threshold leads to an automatic save.

7. The system of claim 5, wherein a second condition of the set of conditions specifies that a determined classification determined via tonal analysis matching to a stored classification leads to an automatic save.

8. The system of claim 7, wherein the determined classification is a determined sentiment of the user based on audio/video (A/V) data of the user.

9. The system of claim 5, wherein a second condition of the set of conditions specifies that an autosave score calculated based on a plurality of weighted contextual factors satisfying an autosave score threshold leads to an automatic save.

10. The system of claim 5, wherein the tag is a file name of the savable content.

11. A computer program product comprising one or more computer readable storage media, and program instructions collectively stored on the one or more computer readable storage media, the program instructions comprising instructions configured to cause one or more processors to perform a method comprising:
receiving a set of conditions for automatically saving content for a user currently engaged with savable content, wherein a first condition of the set of conditions specifies that automatically saving content is completed in response to actions per minute (APM) performed by at least one input device of the user satisfying an APM threshold;
determining a current context of the user currently engaged with the savable content by obtaining a current APM performed by the at least one input device of the user;
comparing the current context of the user to the set of conditions to determine whether automatically saving the savable content should be completed, wherein the comparing includes determining whether the current APM performed by the at least one input device of the user satisfies the APM threshold; and
automatically saving, in response to determining that automatically saving the savable content should be completed, the savable content, wherein determining that automatically saving the savable content should be completed includes determining that the current APM performed by the at least one input device of the user satisfies the APM threshold, wherein the savable content is tagged with a tag comprising metadata that indicates that the automatic saving occurred due to the current APM performed by the at least one input device of the user satisfying the APM threshold.

12. The computer program product of claim 11, wherein a second condition of the set of conditions specifies that a sensor value satisfying a sensor value threshold leads to an automatic save.

13. The computer program product of claim 11, wherein a second condition of the set of conditions specifies that a determined classification matching to a stored classification leads to an automatic save.

14. The computer program product of claim 13, wherein the determined classification is a determined sentiment of the user based on audio/video (A/V) data of the user.

15. The computer program product of claim 11, wherein the set of conditions specify that an autosave score calculated based on a plurality of weighted contextual factors satisfying an autosave score threshold leads to an automatic save.

16. The computer program product of claim 11, wherein the tag is a file name of the savable content.

* * * * *